US012674549B2

(12) United States Patent
Muller et al.

(10) Patent No.: US 12,674,549 B2
(45) Date of Patent: Jul. 7, 2026

(54) FACILITY AND METHOD FOR SUPPLYING LIQUEFIED HYDROGEN

(71) Applicant: L'Air Liquide, Societe Anonyme pour l'Etude et l'Exploitation des Procedes Georges Claude, Paris (FR)

(72) Inventors: Matthieu Muller, Champigny sur Marne (FR); Jean-Marc Peyron, Champigny sur Marne (FR); Matilde Aires, Champigny sur Marne (FR); Emeline Vandroux, Champigny sur Marne (FR); Bhadri Prasad, Champigny sur Marne (FR)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 175 days.

(21) Appl. No.: 18/749,084

(22) Filed: Jun. 20, 2024

(65) Prior Publication Data

US 2024/0426429 A1 Dec. 26, 2024

(30) Foreign Application Priority Data

Jun. 20, 2023 (FR) ................................ FR 2306344

(51) Int. Cl.
*F17C 7/04* (2006.01)

(52) U.S. Cl.
CPC ........ *F17C 7/04* (2013.01); *F17C 2205/0323* (2013.01); *F17C 2205/0352* (2013.01);
(Continued)

(58) Field of Classification Search
CPC ............ F17C 2201/054; F17C 2203/03; F17C 2203/0626; F17C 2205/0323; F17C 2205/0352; F17C 2221/012; F17C 2223/0153; F17C 2223/0161; F17C 2223/033; F17C 2225/0161; F17C 2225/033; F17C 2227/0107;
(Continued)

(56) References Cited

U.S. PATENT DOCUMENTS 9,239,186 B2 * 1/2016 Jung ...................... F25J 1/0254
9,273,639 B2 * 3/2016 Hyde ..................... F02M 21/06
(Continued)

FOREIGN PATENT DOCUMENTS

DE 10 2010 047300 4/2012
FR 3 125 322 1/2023

OTHER PUBLICATIONS

French Search Report for FR 2 306 344, mailed Dec. 4, 2023.

*Primary Examiner* — Filip Zec
(74) *Attorney, Agent, or Firm* — Justin K. Murray

(57) ABSTRACT

The invention relates to a facility for supplying liquefied hydrogen, comprising: a liquefier configured to deliver liquefied hydrogen; a first liquefied hydrogen tank configured to receive liquefied hydrogen coming from the liquefier; a transfer line configured to allow liquefied hydrogen to be transferred from the first tank to a tank to be filled; a second liquefied hydrogen tank configured to receive liquefied hydrogen coming from the first tank; a pressurization system configured to allow the second tank to be pressurized; a vaporization pipe connecting the second tank and/or the pressurization system to the transfer line.

10 Claims, 1 Drawing Sheet

(52) U.S. Cl.
CPC .............................. *F17C 2221/012* (2013.01); *F17C 2223/0153* (2013.01); *F17C 2265/065* (2013.01); *F25J 2215/10* (2013.01); *F25J 2290/62* (2013.01)

(58) Field of Classification Search
CPC ........ F17C 2227/0121; F17C 2227/044; F17C 2250/01; F17C 2265/061; F17C 2265/065; F17C 2270/0171; F17C 5/02; F17C 7/04; F25J 2215/10; F25J 2290/62
See application file for complete search history.

(56) References Cited

U.S. PATENT DOCUMENTS

| | | | | |
|---|---|---|---|---|
| 10,767,921 | B2 * | 9/2020 | Baek | F25J 1/0254 |
| 10,890,293 | B2 * | 1/2021 | Gustafson | F17C 7/00 |
| 11,073,245 | B2 * | 7/2021 | Bernhardt | F17C 6/00 |
| 11,859,771 | B2 * | 1/2024 | Wilson | F17C 9/00 |
| 2014/0033563 | A1 * | 2/2014 | Bison | F25B 6/02<br>34/524 |
| 2014/0116069 | A1 * | 5/2014 | Peterson | C10G 5/06<br>62/50.2 |
| 2015/0068222 | A1 * | 3/2015 | Hakamada | F17C 13/00<br>62/53.2 |
| 2015/0121905 | A1 * | 5/2015 | Watts | F17C 7/04<br>137/1 |
| 2015/0330574 | A1 * | 11/2015 | Fuchs | F25J 1/0265<br>62/48.2 |
| 2016/0146400 | A1 * | 5/2016 | Allidieres | F17C 5/06<br>141/82 |
| 2019/0154331 | A1 * | 5/2019 | De Pater | F25J 1/0025 |
| 2019/0257475 | A1 * | 8/2019 | Bernhardt | F25J 1/0077 |
| 2019/0301678 | A1 * | 10/2019 | Yamaguchi | F17C 13/025 |
| 2020/0149684 | A1 | 5/2020 | Bernhardt et al. | |
| 2021/0254789 | A1 | 8/2021 | Lagoutte et al. | |
| 2021/0341101 | A1 | 11/2021 | Allidieres et al. | |

* cited by examiner

FACILITY AND METHOD FOR SUPPLYING LIQUEFIED HYDROGEN

CROSS REFERENCE TO RELATED APPLICATIONS

This application claims the benefit of priority under 35 U.S.C. § 119 (a) and (b) to French patent application No. FR2306344, filed Jun. 20, 2023, which is herein incorporated by reference in its entirety.

FIELD OF THE INVENTION

The present invention relates to a facility for supplying liquefied hydrogen and to a method for supplying liquefied hydrogen.

BACKGROUND OF THE INVENTION

A hydrogen liquefier is generally configured to produce liquid hydrogen without it being possible to ensure continuous operation. The liquid hydrogen produced by the liquefier is therefore stored in one or more liquefied hydrogen tanks, from which tanks to be filled, such as semi-trailers, are filled. Thus, even when the liquefier is stopped, it continues to be possible to fill one or more tanks to be filled.

During filling of a tank to be filled, it is necessary to perform one or more steps of cleaning and/or purging the transfer lines which are used to transfer the liquefied hydrogen from the tank to the tank to be filled. These steps of cleaning and/or purging are carried out using gaseous hydrogen under pressure, which comes from a high-pressure cycle of the liquefier.

A problem then arises when the liquefier is stopped, given that it becomes impossible to obtain gaseous hydrogen under pressure for cleaning and/or purging the transfer lines.

SUMMARY OF THE INVENTION

Certain embodiments of the present invention seek to effectively overcome these disadvantages by proposing a facility for supplying liquefied hydrogen comprising:

- a source of gaseous hydrogen;
- a liquefier configured to be fed with gaseous hydrogen by the source and to deliver liquefied hydrogen;
- a first liquefied hydrogen tank configured to receive liquefied hydrogen coming from the liquefier, via a first feed pipe, and being configured to store this liquefied hydrogen at a pressure which is below a first predetermined pressure;
- at least one transfer line configured to allow liquefied hydrogen to be transferred from the first tank to a tank to be filled, the transfer line being connected to the first tank by at least one transfer pipe;
- a second liquefied hydrogen tank configured to receive, especially by gravity, liquefied hydrogen coming from the first tank, via a second feed pipe, the second tank being configured to store this liquefied hydrogen;
- a pressurization system configured to allow the second tank to be pressurized at a second predetermined pressure which is greater than the first predetermined pressure;
- at least one vaporization pipe connecting the second tank and/or the pressurization system to the transfer line in order to allow gaseous hydrogen under pressure to be transferred from the second tank and/or from the pressurization system to the transfer line, for example for the purpose of an operation of purging or cleaning the transfer line; and a vaporization system configured to heat the gaseous hydrogen flowing in the vaporization pipe.

Certain embodiments of the invention thus make it possible to perform, in a reliable manner, cleaning or purging of a piece of equipment of a liquefaction facility, such as a transfer line.

According to one embodiment, the facility comprises a control unit configured to selectively transfer gaseous hydrogen under pressure from the second tank and/or from the pressurization system to the transfer line when the liquefier is stopped, for example for the purpose of an operation of purging or cleaning the transfer line.

According to one embodiment, the facility comprises a set of isolation valves configured to fluidically isolate the second tank from the first tank and/or to fluidically isolate the second tank from the transfer line, especially in order to allow the second tank to be pressurized.

According to one embodiment, the pressurization system comprises a pressurization pipe which connects the lower and upper parts of the second tank and comprises an atmospheric heater for converting a portion of the liquefied hydrogen flowing in the pressurization pipe into gaseous hydrogen.

According to one embodiment, the first predetermined pressure is equal to 2 bara.

According to one embodiment, the second predetermined pressure is equal to 5 bara.

According to one embodiment, the transfer line is configured to allow hydrogen vapour to be transferred from the tank to be filled to the liquefier, the transfer line being connected to the liquefier by at least one vapour collection pipe.

According to one embodiment, the vaporization pipe is connected to the liquefier, especially via a purge pipe, in order to allow gaseous hydrogen under pressure to be transferred from a high-pressure cycle of the liquefier to the transfer line, for example for the purpose of an operation of purging and/or cleaning the transfer line.

According to one embodiment, the control unit is configured to selectively transfer gaseous hydrogen under pressure from the liquefier to the transfer line when the liquefier is operating, for example for the purpose of an operation of purging or cleaning the transfer line.

According to one embodiment, the facility comprises a set of valves, for example control valves, each valve of the set being mounted in one of the pipes and being configured to selectively permit or prevent the passage of the fluid flowing in the pipe in which it is mounted.

According to one embodiment, the control unit is configured to control the set of valves in order to permit or prevent the passage of the fluid.

The invention may relate further to a method for supplying liquefied hydrogen by means of a facility as described above, the method comprising the following steps:

a) transferring liquefied hydrogen from the first tank to the second tank;

b) pressurizing the second tank to the second predetermined pressure;

c) transferring gaseous hydrogen under pressure from the second tank and/or from the pressurization system to the transfer line, for example for the purpose of an operation of purging or cleaning the transfer line.

According to one embodiment, step b) is carried out before step c), step b) especially being carried out for a predetermined period of time which is configured to allow the pressure in the second tank to reach the second predetermined pressure.

According to one embodiment, steps a) and/or b) and/or c) are carried out only when the liquefier is stopped.

According to one embodiment, the method comprises step d) of transferring gaseous hydrogen under pressure from the liquefier to the transfer line, for example for the purpose of an operation of purging and/or cleaning the transfer line.

According to one embodiment, steps a), b) and c) are carried out in succession.

BRIEF DESCRIPTION OF THE DRAWINGS

The invention will be understood better from reading the following description and from studying the accompanying figures. These figures are given only by way of illustration and do not in any way limit the invention.

DETAILED DESCRIPTION OF THE INVENTION

Figure 1:
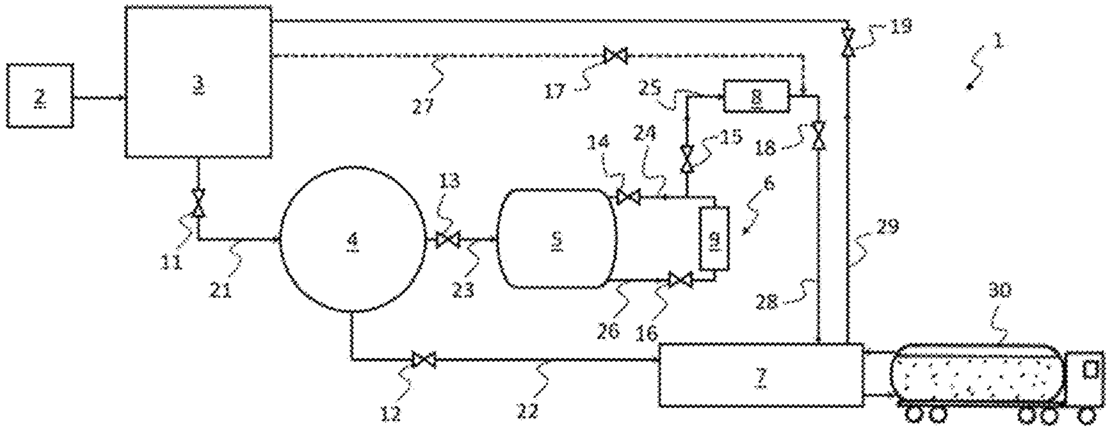
FIG. 1 is a schematic depiction of a facility according to the invention.

With reference to FIG. 1, a facility 1 for supplying liquefied hydrogen comprises a liquefier 3 and a source 2 of gaseous hydrogen. The liquefier 3 is configured to be fed with gaseous hydrogen by the source 2 and to deliver liquefied hydrogen.

The facility 1 comprises a first liquefied hydrogen tank 4 configured to receive liquefied hydrogen coming from the liquefier 3, via a first feed pipe 21, and being configured to store this liquefied hydrogen at a pressure which is below a first predetermined pressure.

The first predetermined pressure is equal to 2 bara.

The facility 1 comprises at least one transfer line 7 configured to allow liquefied hydrogen to be transferred from the first tank 4 to a tank to be filled 30, such as a semi-trailer, the transfer line 7 being connected to the first tank 4 by at least one transfer pipe 22.

The facility 1 comprises a second liquefied hydrogen tank 5 configured to receive liquefied hydrogen coming from the first tank 4, via a second feed pipe 23, the second tank 5 being configured to store this liquefied hydrogen.

The first 4 and second 5 tanks each comprise walls separated by insulation.

The facility 1 comprises a pressurization system 6 configured to allow the second tank 5 to be pressurized at a second predetermined pressure which is greater than the first predetermined pressure.

The second predetermined pressure is equal to 5 bara.

The facility 1 comprises at least one vaporization pipe 28 connecting the second tank 5 and/or the pressurization system 6 to the transfer line 7 in order to allow gaseous hydrogen under pressure to be transferred from the second tank 5 and/or from the pressurization system 6 to the transfer line 7, for example for the purpose of an operation of purging or cleaning the transfer line 7.

The facility 1 comprises a vaporization system 8 configured to heat the gaseous hydrogen flowing in the vaporization pipe 28.

The vaporization system 8 is fluidically connected to the pressurization pipe 26 via a fluid inlet pipe 25.

The facility 1 comprises a control unit configured to selectively transfer gaseous hydrogen under pressure from the second tank 5 and/or from the pressurization system 6 to the transfer line 7 when the liquefier 3 is stopped, for example for the purpose of an operation of purging or cleaning the transfer line 7.

The facility 1 comprises a set of isolation valves 13, 15 configured to fluidically isolate the second tank 5 from the first tank 4 and/or to fluidically isolate the second tank 5 from the transfer line 7, especially in order to allow the second tank 5 to be pressurized.

The pressurization system 6 comprises a pressurization pipe 24, 26 which connects the lower and upper parts of the second tank 5 and comprises an atmospheric heater 9 for converting a portion of the liquefied hydrogen flowing in the pressurization pipe 24, 26 into gaseous hydrogen.

The transfer line 7 is configured to allow hydrogen vapour to be transferred from the tank to be filled 30 to the liquefier 3, the transfer line 7 being connected to the liquefier 3 by at least one vapour collection pipe 29.

The vaporization pipe 28 is connected to the liquefier 3, especially via a purge pipe 27, in order to allow gaseous hydrogen under pressure to be transferred from a high-pressure cycle of the liquefier 3 to the transfer line 7, for example for the purpose of an operation of purging and/or cleaning the transfer line 7.

The control unit is configured to selectively transfer gaseous hydrogen under pressure from the liquefier 3 to the transfer line 7 when the liquefier 3 is operating, for example for the purpose of an operation of purging or cleaning the transfer line 7.

The facility comprises a set of valves (11, 12, 13, 14, 15, 16, 17, 18, 19), for example control valves, each valve (11, 12, 13, 14, 15, 16, 17, 18, 19) of the set being mounted in one of the pipes and being configured to selectively permit or prevent the passage of the fluid flowing in the pipe in which it is mounted.

According to one embodiment, the control unit is configured to control the set of valves (11, 12, 13, 14, 15, 16, 17, 18, 19) in order to permit or prevent the passage of the fluid in the pipe in which the valve of the set of valves is mounted.

Figure 2:
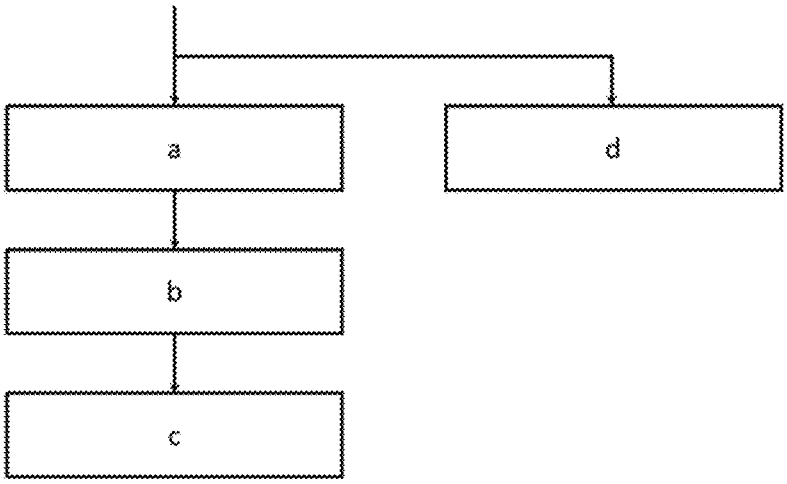
FIG. 2 is a schematic depiction of a method according to the invention.

FIG. 2 shows a method for supplying liquefied hydrogen by means of a facility 1 as described above. The method comprises the following steps:

a) transferring liquefied hydrogen from the first tank 4 to the second tank 5;
b) pressurizing the second tank 5 to the second predetermined pressure;
c) transferring gaseous hydrogen under pressure from the second tank 5 and/or from the pressurization system 6 to the transfer line 7, for example for the purpose of an operation of purging or cleaning the transfer line 7.

Step b) is carried out before step c).

Step b) is carried out for a predetermined period of time which is configured to allow the pressure in the second tank 5 to reach the second predetermined pressure.

Steps a) and/or b) and/or c) are carried out only when the liquefier 3 is stopped. This makes it possible for cleaning and/or purging, for example of the transfer line 7, to be carried out even when the liquefier 3 is stopped or unavailable, or alternatively when it is no longer able to supply liquefied hydrogen.

The method comprises a step d) of transferring gaseous hydrogen under pressure from the liquefier 3 to the transfer line 7, for example for the purpose of an operation of purging and/or cleaning the transfer line 7. This makes it possible, in a nominal operating mode, to carry out cleaning and/or purging, for example of the transfer line 7.

Steps a), b) and c) are carried out in succession, in that order.

Step a) is carried out as soon as the fill level of the second tank 5 becomes lower than a first predetermined level, for example equal to 30%, preferably equal to 1%.

Step b) is carried out when the fill level of the second tank 5 becomes greater than a second predetermined level, for example equal to 30%, preferably equal to 50%. The second predetermined level is greater than the first predetermined level.

Step b) is carried out when the pressure in the second tank 5 is below the second predetermined pressure.

The second predetermined pressure is determined in order to make it possible to carry out correct cleaning and/or correct purging of the transfer line 7.

Step b) is carried out when an operation of cleaning or purging is required and if the pressure in the second tank 5 is below the second predetermined pressure. In a variant, step b) is carried out so as to permanently maintain the pressure in the second tank at the second predetermined pressure.

Step c) is carried out as soon as the fill level of the second tank 5 becomes greater than the second predetermined level.

Step c) is carried out when an operation of cleaning or purging is required and if the pressure in the second tank 5 is greater than or equal to the second predetermined pressure.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms “a”, “an” and “the” include plural referents, unless the context clearly dictates otherwise.

“Comprising” in a claim is an open transitional term which means the subsequently identified claim elements are a nonexclusive listing (i.e., anything else may be additionally included and remain within the scope of “comprising”). “Comprising” as used herein may be replaced by the more limited transitional terms “consisting essentially of” and “consisting of” unless otherwise indicated herein.

“Providing” in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

The invention claimed is:

1. A facility for supplying liquefied hydrogen, comprising:

a source of gaseous hydrogen;

a liquefier configured to be fed with gaseous hydrogen by the source and to produce liquefied hydrogen;

a first liquefied hydrogen tank configured to receive liquefied hydrogen coming from the liquefier, via a first feed pipe, and being configured to store this liquefied hydrogen at a pressure which is below a first predetermined pressure;

at least one transfer line configured to allow liquefied hydrogen to be transferred from the first tank to a tank to be filled, the transfer line being connected to the first tank by at least one transfer pipe;

a second liquefied hydrogen tank configured to receive liquefied hydrogen coming from the first tank, via a second feed pipe, the second tank being configured to store this liquefied hydrogen;

a pressurization system configured to allow the second tank to be pressurized at a second predetermined pressure which is greater than the first predetermined pressure;

at least one vaporization pipe connecting the second tank and the pressurization system to the transfer line in order to allow gaseous hydrogen under pressure to be transferred from the second tank and from the pressurization system to the transfer line, for the purpose of an operation of purging and cleaning the transfer line; and a vaporization system configured to heat the gaseous hydrogen flowing in the vaporization pipe.

2. The facility according to claim 1, further comprising a control unit configured to selectively transfer gaseous hydrogen under pressure from the second tank and from the pressurization system to the transfer line when the liquefier is stopped, for the purpose of an operation of purging and cleaning the transfer line.

3. The facility according to claim 1, further comprising a set of isolation valves configured to fluidically isolate the second tank from the first tank and to fluidically isolate the second tank from the transfer line, in order to allow the second tank to be pressurized.

4. The facility according to claim 1, wherein the pressurization system comprises a pressurization pipe which connects the lower and upper parts of the second tank and comprises an atmospheric heater for converting a portion of the liquefied hydrogen flowing in the pressurization pipe into gaseous hydrogen.

5. The facility according to claim 1, wherein the transfer line is configured to allow hydrogen vapour to be transferred from the tank to be filled to the liquefier, the transfer line being connected to the liquefier by at least one vapour collection pipe.

6. The facility according to claim 1, wherein the vaporization pipe is connected to the liquefier, via a purge pipe, in order to allow gaseous hydrogen under pressure to be transferred from a high-pressure cycle of the liquefier to the transfer line, for the purpose of an operation of purging and cleaning the transfer line.

7. A method for supplying liquefied hydrogen using the facility as claimed in claim 1, the method comprising the following steps:

a) transferring liquefied hydrogen from the first tank to the second tank;

b) pressurizing the second tank to the second predetermined pressure; and c) transferring gaseous hydrogen under pressure from the second tank and from the pressurization system to the transfer line, thereby purging and cleaning the transfer line.

8. The method according to claim 7, wherein step b) is carried out before step c), step b) being carried out for a predetermined period of time which is configured to allow the pressure in the second tank to reach the second predetermined pressure.

9. The method according to claim 7, wherein steps a) and b) and c) are carried out only when the liquefier is stopped.

10. The method according to claim 7, further comprising the step d) of transferring gaseous hydrogen under pressure from the liquefier to the transfer line, for the purpose of an operation of purging and cleaning the transfer line.

* * * * *